(12) United States Patent
Chen et al.

(10) Patent No.: US 12,436,357 B2
(45) Date of Patent: Oct. 7, 2025

(54) OPTICAL LENS, CAMERA MODULE AND MANUFACTURING METHOD THEREOF

(71) Applicant: Ningbo Sunny Opotech Co., Ltd., Zhejiang (CN)

(72) Inventors: Liefeng Chen, Zhejiang (CN); Zhewen Mei, Zhejiang (CN); Takehiko Tanaka, Zhejiang (CN); Lin Liu, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 882 days.

(21) Appl. No.: 17/438,265

(22) PCT Filed: Mar. 11, 2020

(86) PCT No.: PCT/CN2020/078785
§ 371 (c)(1),
(2) Date: Sep. 10, 2021

(87) PCT Pub. No.: WO2020/182145
PCT Pub. Date: Sep. 17, 2020

(65) Prior Publication Data
US 2022/0187561 A1    Jun. 16, 2022

(30) Foreign Application Priority Data
Mar. 13, 2019 (CN) .................. 201910187233.X

(51) Int. Cl.
*G02B 7/02* (2021.01)
*H02K 41/035* (2006.01)

(52) U.S. Cl.
CPC ............. *G02B 7/022* (2013.01); *G02B 7/021* (2013.01); *G02B 7/025* (2013.01); *H02K 41/0354* (2013.01)

(58) Field of Classification Search
CPC ......... G02B 7/022; G02B 7/021; G02B 7/025
See application file for complete search history.

(56) References Cited

U.S. PATENT DOCUMENTS

| | | |
|---|---|---|
| 2002/0089176 A1 | 7/2002 | Iwasaki |
| 2008/0130144 A1 | 6/2008 | Chang |
| | (Continued) | |

FOREIGN PATENT DOCUMENTS

| | | |
|---|---|---|
| CN | 1167965 | 9/2004 |
| CN | 101452105 | 6/2009 |
| | (Continued) | |

OTHER PUBLICATIONS

International Search Report issued Jun. 5, 2020 in International (PCT) Application No. PCT/CN2020/078785 with English translation.

*Primary Examiner* — Wen Huang
(74) *Attorney, Agent, or Firm* — Wenderoth, Lind & Ponack, L.L.P.

(57) ABSTRACT

An optical lens has a lens component including at least one first lens and a lens barrel portion holding the at least one first lens, an outer part of the lens barrel portion having a first fastener arranged in a circumferential direction, and a lens driving component including a drive portion and a drive portion carrier. The drive portion drives the lens component, and an inner part of the drive portion carrier has a second fastener arranged in a circumferential direction. The first and second fasteners are engaged to couple the lens component and the lens driving component, and one of the first and second fasteners has an inclined portion that is inclinedly configured in the circumferential direction.

19 Claims, 6 Drawing Sheets

(56) References Cited

U.S. PATENT DOCUMENTS

| | | | |
|---|---|---|---|
| 2010/0271718 A1 | 10/2010 | Ho | |
| 2011/0273785 A1 | 11/2011 | Hatakeyama | |
| 2013/0258502 A1 | 10/2013 | Lai | |
| 2016/0269601 A1 | 9/2016 | Yeon et al. | |
| 2019/0011663 A1 | 1/2019 | Weng et al. | |

FOREIGN PATENT DOCUMENTS

| | | |
|---|---|---|
| CN | 101191890 | 5/2010 |
| CN | 101872053 | 10/2010 |
| CN | 202995127 | 6/2013 |
| CN | 203732789 | 7/2014 |
| CN | 207336892 | 5/2018 |
| CN | 109212712 | 1/2019 |
| EP | 3 373 066 | 9/2018 |
| JP | 09-105969 | 4/1997 |
| JP | 2006-091607 | 4/2006 |
| JP | 2008-145631 | 6/2008 |
| JP | 2016-029416 | 3/2016 |
| KR | 10-2010-0052083 | 5/2010 |
| WO | 2017/017589 | 2/2017 |

OPTICAL LENS, CAMERA MODULE AND MANUFACTURING METHOD THEREOF

CROSS REFERENCES TO RELATED APPLICATIONS

This application claims the priority of the invention patent application No. 201910187233.X with the title of "optical lens, camera module and manufacturing method thereof" filed with the China National Intellectual Property Administration on Mar. 13, 2019, and the entire content of the above patent application is incorporated herein by reference.

FIELD OF THE INVENTION

This application relates to field of optical lenses, and particularly to an optical lens, a camera module and a manufacturing method thereof.

BACKGROUND OF THE INVENTION

With the continuous development and progress of science and technology, mobile electronic equipment have become more and more popular, and the related technologies of imageable optical devices used in mobile electronic equipment to help users obtain images (such as videos or images) have been rapidly developed and advanced, and have been widely used in many fields such as medical treatment, security, industrial production, etc.

In order to meet the increasing demand of consumers for taking pictures, auto-focusing camera modules are widely used in digital products, such as smart phones, tablet computers, surveillance and other terminal devices, and are showing a trend of rapid development.

Nowadays, digital products are developing towards miniaturization and high-performance. Correspondingly, higher and higher requirements are put forward for the volume and performance of auto-focusing camera modules.

Factors affecting the resolution of imageable optical devices of a given optical design include the quality of optical imaging lenses and the manufacturing errors in a module packaging process.

Specifically, in the manufacturing process of the optical imaging lenses, the factors affecting the resolution of the lens come from the errors of each element and its assembly, the error of the thickness of a lens spacer element, the error of the assembly and coordination of each lens, and the change of the refractive index of a lens material.

In the art, a motor is usually used to realize autofocus of an optical lens. A voice coil motor is one of the mechanisms used to provide automatic focusing of the optical lens. In a camera module with a voice coil motor, the optical lens is first installed in a lens barrel, and the lens barrel is arranged in the voice coil motor carrier through a thread or fastener connection method. However, the thread or fastener connection method will adversely affect the volume or performance of the camera module. When the lens barrel and the motor carrier are connected in the thread method, a thread portion needs to be machined in the motor carrier and on a side wall of the lens barrel. The thread portion will make the corresponding drive motor larger, resulting in a relatively larger volume of the camera module. In addition, when the lens barrel is screwed into the motor for engagement through the thread portion, due to the action of torsion, the engagement between the thread portion on the lens barrel and the thread portion on the carrier will generate debris, and this debris will cause particulate pollution to the camera module, which makes an imaging dirty.

The fastener connection method can reduce the generation of the debris to a certain extent. The conventional fastener connection is to first connect a lens component and the motor through a fastener, then apply a glue material at the fastener, and finally cure the glue material by a method corresponding to the glue material, so that the lens and the drive motor are firmly engaging, in which the method of curing the glue material includes UV exposure or baking. Since the position of the fastener is fixed, a height fixing process in a common motor lens locking process can be omitted. However, as current lens specifications continue to increase, from 20 M, 40 M, and 48 M to 64 M and even higher pixel numbers, it is necessary to design higher-pixel lenses in a smaller space. Such lenses have very high optical sensitivity. Therefore, the requirements for eccentricity and tilt generated in the manufacturing process of the optical lens are very strict. In the current fastener connection method, in order to enable a female fastener of the fastener on the motor carrier to engage with a male fastener of the fastener on the lens barrel, there is a gap of at least 0.1 mm between the female fastener of the fastener and the male fastener of the fastener. Therefore, the gap cannot be effectively eliminated at present.

When the glue material is cured, the glue material will shrink. The force generated by shrinkage will pull the male fastener of the fastener to move in any possible direction, and drive lens position to move (mainly upward). Because the amount of the glue material applied at each fastener is inconsistent, and the direction of shrinkage of the glue material is also inconsistent, the lens deviates from an optical axis and causes a certain eccentricity and tilt. As a result, the Active Alignment process cannot be used to compensate for all tilts, which seriously affects the assembly yield of the camera module.

In addition, as mentioned above, because there are many factors that affect the resolution of the lens, which exist in multiple components, the control of each factor has the limit of manufacturing accuracy. If only the accuracy of each component is improved, the ability of improvement is limited, and the cost of improvement is high, and cannot meet the market's increasing demand for imaging quality.

In recent years, a module factory has compensated for the tilt of a photosensitive chip through the Active Alignment process when assembling an imaging lens and a photosensitive module. However, the compensation capability of this process is limited. Since various aberrations that affect the resolution come from the capabilities of an optical system itself, when the resolution of the optical imaging lens itself is insufficient, the existing active calibration process of the photosensitive module is difficult to compensate.

Therefore, a new connection method that can solve the above problems is urgently needed to improve the imaging quality of the camera module and the assembly quality of the camera module.

SUMMARY OF THE INVENTION

The present application aims to provide a solution that can overcome at least one of the above-mentioned drawbacks of the prior art.

An aspect of the present application provides an optical lens, which includes: a lens component, including at least one first lens and a lens barrel portion holding the at least one first lens therein, wherein an outer side portion of the lens barrel portion have a first fastener and a first coupling portion arranged in a circumferential direction; and a lens driving component, including a driving portion and a driving portion carrier, wherein the driving portion drives the lens component, and an inner side portion of the driving portion carrier have a second fastener and a second coupling portion arranged in a circumferential direction, and the first fastener and the second fastener are engaged, and the first coupling portion and the second coupling portion are engaged to jointly couple the lens component and the lens driving component.

In an embodiment of the present application, the first coupling portion and the second coupling portion include threads.

In an embodiment of the present application, the first coupling portion and the second coupling portion include fasteners.

In an embodiment of the present application, one of the first fastener and the second fastener has an inclined portion inclined relative to the circumferential direction at an upper surface or a lower surface in an optical axis direction.

In an embodiment of the present application, the inclined portion is an inclined surface.

In an embodiment of the present application, a maximum dimension of the inclined portion in an axial direction is the same as a maximum dimension of the other fastener in the axial direction.

In an embodiment of the present application, the optical lens further includes a glue material, and the glue material may be located between the first fastener and the second fastener to bond the lens component and the lens driving component together.

In an embodiment of the present application, the first fastener is a male fastener, and the second fastener is a female fastener.

In an embodiment of the present application, at least one of the first fastener and the second fastener include a boss to prevent the male fastener from releasing from the female fastener.

In an embodiment of the present application, the first fastener and the second fastener, the first coupling portion and the second coupling portion are evenly distributed along the circumferential direction.

In an embodiment of the present application, the glue material is a light curing, thermal curing, moisture curing, anaerobic curing or oxidative curing glue material.

In an embodiment of the present application, the lens component is a split lens component.

According to another aspect of the present application, there also provides an optical lens, including: a lens component, including at least one first lens and a lens barrel portion holding the at least one first lens therein, wherein an outer side portion of the lens barrel portion has a first fastener arranged along a circumferential direction; and a lens driving component, including a drive portion and a driving portion carrier, wherein the driving portion drives the lens component, and an inner side portion of the driving portion carrier has a second fastener arranged in a circumferential direction, and the first fastener and the second fastener are engaged to couple the lens component and the lens driving component, and the first fastener and/or the second fastener has an inclined portion.

In an embodiment of the present application, the inclined portion is located on an upper surface or a lower surface of one of the first fastener and the second fastener in an axial direction, and is inclined relative to the circumferential direction.

In an embodiment of the present application, the inclined portion is located on the lower surfaces of the first fastener and the second fastener in the axial direction, and is inclined relative to a radial direction.

In an embodiment of the present application, a maximum dimension of the inclined portion in the axial direction is the same as a maximum dimension of the other fastener in the axial direction.

In an embodiment of the present application, the optical lens further includes a glue material, and the glue material is located between the first fastener and the second fastener to bond the lens component and the lens driving component together.

In an embodiment of the present application, the first fastener is a male fastener, and the second fastener is a female fastener.

In an embodiment of the present application, at least one of the first fastener and the second fastener includes a boss to prevent the first fastener from releasing from the second fastener.

In an embodiment of the present application, the first fastener and the second fastener are configured in two or more layers in the axial direction.

In an embodiment of the present application, the first fasteners and the second fasteners are evenly distributed in the axial direction.

In an embodiment of the present application, the glue material is a light curing, thermal curing, moisture curing, anaerobic curing or oxidative curing glue material.

In an embodiment of the present application, the lens component is a split lens component.

According to another aspect of the present application, there also provides a camera module including the aforementioned optical lens.

According to another aspect of the present application, there also provides a method for manufacturing an optical lens. The method for manufacturing the optical lens includes the following steps:

arranging a first fastener and a first coupling portion in a circumferential direction of an outer side portion of a lens barrel portion of a lens component;

arranging a second fastener and a second coupling portion in a circumferential direction of an inner side portion of a driving portion carrier of a lens driving component, arranging the lens component in the driving portion carrier, and circumferentially rotate the lens component to engage the first fastener and the second fastener, and to engage the first coupling portion and the second coupling portion, so as to jointly couple the lens component and the lens driving component; and applying a glue material between the first fastener and the second fastener to bond the lens component and the lens driving component together.

According to another aspect of the present application, there also provides a method for manufacturing an optical lens. The method for manufacturing the optical lens includes the following steps:

arranging a first fastener in a circumferential direction of an outer side portion of a lens barrel portion of a lens component;

arranging a second fastener in a circumferential direction of an inner side portion of a driving portion carrier of a lens driving component;

configuring an inclined portion on the first fastener and/or the second fastener; and applying a glue material between the first fastener and/or the second fastener to bond the lens component and the lens driving component together.

In an embodiment of the present application, configuring an inclined portion on the first fastener and/or the second fastener includes: configuring one of the first fastener and the second fastener with the inclined portion on an upper surface or a lower surface in an axial direction, and configuring the inclined portion to be inclined relative to the circumferential direction.

In an embodiment of the present application, configuring an inclined portion on the first fastener and/or the second fastener includes: configuring the inclined portion on a lower surface of the first fastener and the second fastener in an axial direction and configuring the inclined portion to be inclined relative to a radial direction.

Compared with the prior art, the present application has at least one of the following technical effects:
1. The present application can reduce the lens position shift caused by the assembly tolerance of the camera module.
2. The present application can reduce the tilt of the camera module.
3. The present application can reduce the volume of the camera module.
4. The present application can improve the stability of the optical system and improve the imaging quality of the camera module.
5. The present application helps to improve the yield of optical lenses or camera modules made based on active calibration.

BRIEF DESCRIPTION OF THE DRAWINGS

Exemplary embodiments are shown in the referenced drawings. The embodiments and drawings disclosed herein should be regarded as illustrative rather than restrictive.

DETAIL DESCRIPTION OF THE INVENTION

Figure 1:
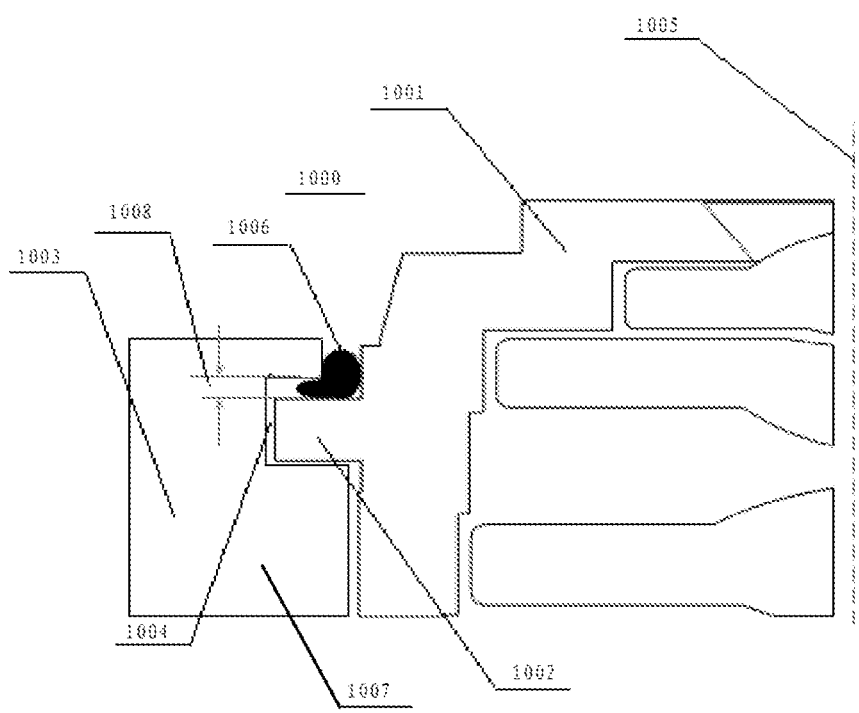
FIG. 1 shows a schematic partial cross-sectional view of the optical lens adopting a fastener connection method in the prior art.

In order to better understand the present application, various aspects of the present application will be described in more details with reference to the accompanying drawings. It should be understood that these detailed descriptions are only descriptions of exemplary embodiments of the present application, and are not intended to limit the scope of the present application in any way. Throughout the specification, the same reference numerals refer to the same elements. The expression "and/or" includes any and all combinations of one or more of the associated listed items.

It should be noted that in this specification, expressions such as first, second, third, etc. are only used to distinguish one feature from another feature, and do not represent any restriction on the feature. Therefore, without departing from the teachings of the present application, the first lens component discussed below may also be referred to as the second lens component.

In the drawings, for ease of description, the thickness, dimension, and shape of each component may have been slightly exaggerated. Specifically, the shape of the spherical or aspheric surface shown in the drawings is shown by way of example. That is, the shape of the spherical surface or the aspheric surface is not limited to the shape of the spherical surface or the aspheric surface shown in the drawings. The drawings are only examples and are not drawn strictly to scale.

It should also be understood that the terms "include", "including", "have", "include" and/or "including", when used in this specification, mean that the stated features, elements and/or components are present, but does not exclude the presence or addition of one or more other features, elements, components and/or a combination thereof. In addition, when expressions such as "at least one of . . . " appear after the list of listed features, the entire listed feature is modified instead of individual elements in the list. In addition, when describing the embodiments of the present application, "may" is used to mean "one or more embodiments of the present application". Also, the term "exemplary" is intended to refer to an example or illustration.

As used herein, the terms "approximately", "about" and similar terms are used as terms representing approximation, not as terms representing degree, and are intended to describe the inherent deviation in the measured values or calculated values that will be recognized by those of ordinary skill in the art.

Unless otherwise defined, all terms (including technical terms and scientific terms) used herein have the same meanings as commonly understood by those of ordinary skill in the art to which the present application belongs. It should also be understood that terms (such as those defined in commonly used dictionaries) should be interpreted as having meanings consistent with their meanings in the context of related technologies, and will not be interpreted in an idealized or excessively formal sense unless this is clearly defined herein.

It should be noted that the embodiments in the present application and the features in the embodiments can be combined with each other if there is no conflict. In addition, unless clearly defined or contradictory to the context, the specific steps included in the method described in the present application are not necessarily limited to the described order, and can be executed in any order or in parallel. For example, an active alignment step described in the present application can be executed interchangeably with an adhesive deployment step without affecting the implementation of the technical solution of the present application. Hereinafter, the present application will be described in detail with reference to the drawings and in conjunction with the embodiments.

FIG. 1 shows a schematic partial cross-sectional view of an optical lens 1000 adopting a fastener connection method in the prior art. As shown in FIG. 1, the optical lens 1000 includes: a lens component 1001, including a lens and a lens barrel portion holding the lens therein, wherein an outer side portion of the lens barrel portion has a male fastener 1002 arranged in a circumferential direction; and a lens driving component 1007, including a driving portion and a driving portion carrier 1003, wherein the driving portion drives the lens component 1001, and an inner side portion of the driving portion carrier 1003 has a female fastener 1004 arranged in a circumferential direction. The male fastener 1002 and the female fastener 1004 are engaged to couple the lens component 1001 and the lens driving component 1007.

When assembling the optical lens 1000 adopting the fastener connection method in the prior art, the male fastener 1002 on the lens component 1001 is aligned with a space between the female fasteners 1004 on the driving portion carrier 1003 of the lens driving component 1007, and then the lens component 1001 will be placed in the driving portion carrier. Then, the lens component 1001 is rotated circumferentially around an optical axis 1005 of the optical lens to rotate the male fastener 1002 into the female fastener 1004. Then, a glue material 1006 is applied between the male fastener 1002 and the female fastener 1004, and the glue material 1006 is cured by a curing method corresponding to the glue material 1006, and finally the assembly of the lens component 1001 and the lens driving component 1007 is completed. The glue material 1006 can be a light curing, thermal curing, moisture curing, anaerobic curing or oxidation curing glue material.

Axial dimensions of the male fastener 1002 and the female fastener 1004 are configured such that there is a gap 1008 between the male fastener 1002 and the female fastener 1004 after assembly. In order to smoothly engage the male fastener 1002 with the female fastener 1004 so that the male fastener 1002 and the female fastener 1004 match and be assembled normally, the gap 1008 is at least 0.1 mm.

It can be seen from FIG. 1 that after the glue material 1006 is cured, the glue material 1006 shrinks. The force generated by shrinkage will pull the male fastener 1002 to move in any possible direction. In the embodiment shown in FIG. 1, the glue material 1006 drives the male fastener 1002 to move upward, and thus drives the lens component 1001 to move upward. Since the amount of the glue material 1006 applied on each fastener are inconsistent, and the directions of shrinkage of the glue material are also inconsistent, the lens component 1001 deviates from the optical axis 1005 and causes a certain eccentricity and tilt. As a result, the active alignment process cannot be used to compensate for all tilts, which seriously affects the assembly yield of the camera module.

Figure 2:
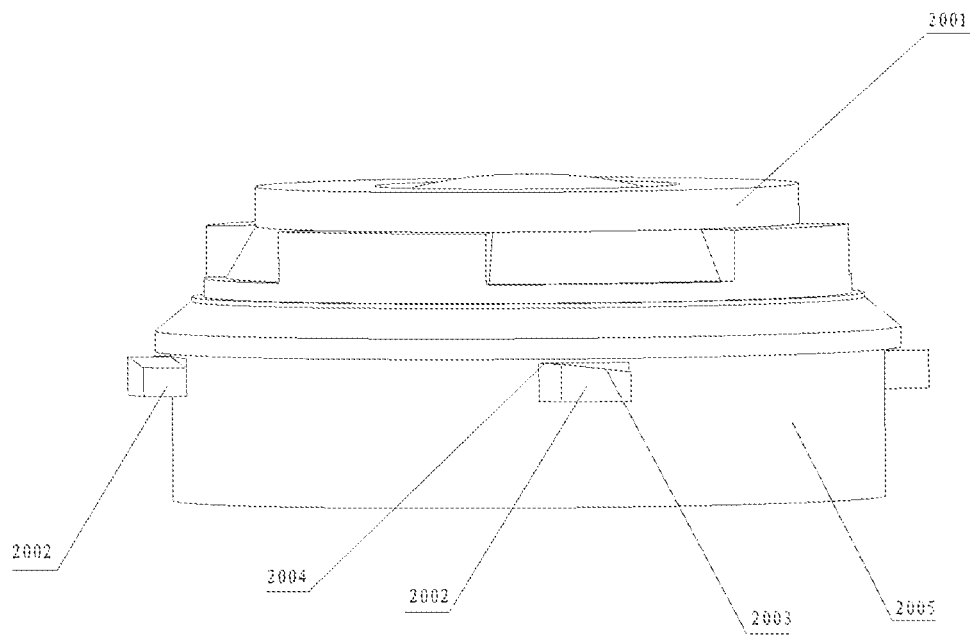
FIG. 2 shows a schematic perspective view of a lens component according to an embodiment of the present application, wherein an outer side portion of a lens barrel portion of the lens component has a first fastener arranged in a circumferential direction.

FIG. 2 shows a schematic perspective view of a lens component 2001 according to the first embodiment of the present application.

As shown in FIG. 2, a general structure of the lens component 2001 of the first embodiment is similar to the structure shown in FIG. 1.

Referring to FIG. 2, an outer side portion of a lens barrel portion 2005 of the lens component 2001 has a plurality of first fasteners arranged in a circumferential direction. In the embodiment of the present application, a plurality of first fasteners is evenly distributed along the circumferential direction of the lens component and the lens barrel portion.

In this embodiment, the first fastener is a male fastener 2002 protruding from the outer side portion of the lens barrel portion 2005, and the driving portion carrier (not shown) used with the lens component 2001 has a similar structure to the driving portion carrier 1003 shown in FIG. 1, that is, has a similar female fastener.

As shown in the figure, the male fastener 2002 has an inclined portion 2003 configured obliquely in the circumferential direction. In this embodiment, an upper mating surface of the male fastener 2002 is partially or completely inclined in a rotation direction, that is, the male fastener 2002 is configured with the inclined portion 2003 on an upper portion.

In the present application, by using the inclination of the inclined portion 2003 in the rotation direction of the lens component 2001, a maximum dimension of the inclined portion 2003 in a axial direction may be the same as a maximum dimension of the female fastener in the axial direction, Therefore, there is no need to reserve a gap of at least 0.1 mm between the female fastener and the male fastener 2002.

During the assembly process, a lower end of the male fastener 2002 enters the female fastener through, and continues to rotate until they are clamped, and then a glue material is applied and they are fixed.

Since there is no design gap reserved, after the lens component 2001 and a motor carrier are assembled, the male fastener 2002 and the female fastener are tightly combined. Then, the glue material is applied between the male fastener 2002 and the female fastener to bond the lens component 2001 and the lens driving component together. In the curing process of the glue material, the influence of the glue material variation on the lens components is relatively small.

In FIG. 2, the male fastener 2002 is configured with the inclined portion 2003 on the upper portion. Alternatively, the inclined portion 2003 may be configured at a lower mating surface of the male fastener 2002, or the upper mating surface and the lower mating surface of the male fastener 2002 are configured with an inclined portion 2003 in the rotation direction at the same time.

Figure 3:
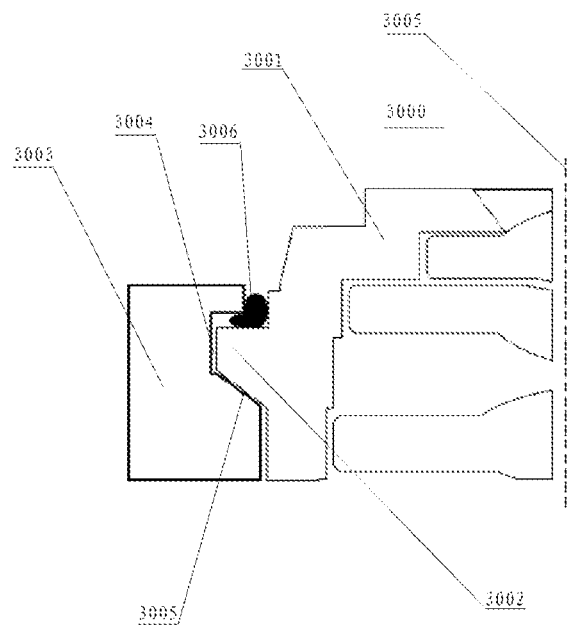
FIG. 3 shows a schematic partial cross-sectional view of an optical lens according to an embodiment of the present application, wherein lower mating surfaces of the male fastener and the female fastener are inclined surfaces inclined relative to an axial direction.

FIG. 3 shows a schematic partial cross-sectional view of an optical lens 3000 according to the second embodiment of the present application, wherein a lower mating surface 3005 between a male fastener 3002 and a female fastener 3004 is an inclined surface inclined relative to an axial direction.

As shown in FIG. 3, a general structure of the optical lens 3000 of the second embodiment is similar to the structure of the optical lens 1000 shown in FIG. 1.

Referring to FIG. 3, the lower mating surface 3005 between the male fastener 3002 and the female fastener 3004 is all or partly configured as an inclined surface in a radial direction:

The lower mating surface 3005 between the male fastener 3002 and the female fastener 3004 is configured to be an inclined surface, so that under the same dimensions of the driving portion carrier 3003 and the lens component 3001, the inclined mating surface between the male fastener 3002 and the female fastener 3004 has a larger mating area, or when a certain size of mating area is guaranteed, the width of the motor with the inclined mating surface can be relatively small, so that the overall dimension of a camera module can be reduced by at least 0.2 mm in the XY direction to further meet the market's demand for module miniaturization.

In addition, configuring the lower mating surface 3005 as the inclined surface makes it easier to align an optical axis of the lens component 3001 with the axis of the motor, thereby improving a center alignment of the assembly of the lens component 3001 and the motor to reduce the eccentricity of the lens component 3001.

The inclination configured in a diameter direction of the lens component 3001 will cause an assembly portion composed of multiple male fasteners on the lens component 3001 and an assembly portion composed of multiple corresponding female fasteners on the motor to form a conical-like assembly relationship, which allows the male fastener 3002 and the female fastener 3004 to be in close contact, thereby facilitating centering.

Figure 4:
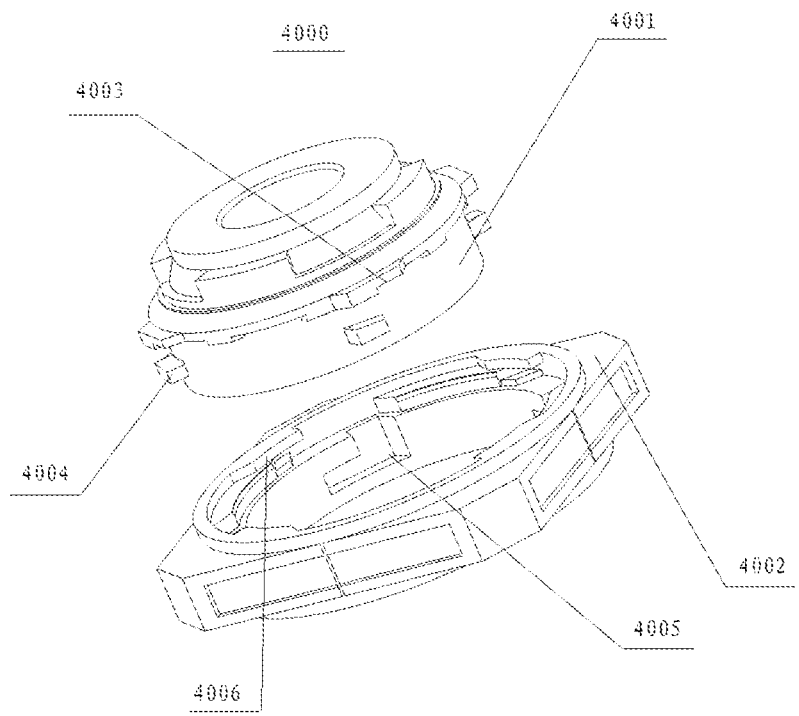
FIG. 4 shows a schematic exploded perspective view of an optical lens according to an embodiment of the present application, wherein the first fastener and the second fastener are configured in two layers in the axial direction.

FIG. 4 shows a schematic exploded perspective view of an optical lens 4000 according to the third embodiment of the present application.

As shown in FIG. 4, the optical lens 4000 includes: a lens component 4001, including a lens and a lens barrel portion holding the lens therein, wherein an outer side portion of the lens barrel portion has a male fastener 4004 arranged in a circumferential direction; and a lens driving portion, including a driving portion and a driving portion carrier 4002, wherein the driving portion drives the lens component, and an inner side portion of the driving portion carrier 4002 has a female fastener 4005 arranged in a circumferential direction. The male fastener 4004 and the female fastener 4005 are engaged to couple the lens component 4001 and the driving portion carrier 4002.

At the time of assembling the optical lens 4000 in the third embodiment, the male fastener 4004 on the lens component 4001 is aligned with a space between the female fasteners 4005 on the driving portion carrier 4002 of the lens driving component, and then the lens component 4001 is placed into the driving portion carrier 4002. Then, the lens component 4001 is rotated circumferentially around an optical axis of the optical lens 4000 to rotate the male fastener 4004 into the female fastener 4005. Then, a glue material (not shown) is applied between the male fastener 4004 and the female fastener 4005, and the glue material is cured by a curing method corresponding to the glue material, and finally the assembly of the lens component 4000 and the lens driving component is completed. The glue material can be a light curing, heat curing, moisture curing, anaerobic curing or oxidation curing glue.

As shown in FIG. 4, in addition to the male fastener 4004, that is, a first layer fastener structure, the optical lens 4000 is also configured with a second layer fastener structure 4003 in an optical axis direction. In other words, the optical lens 4000 is configured with a double-layer fastener structure, that is, the first layer fastener structure 4004 and the second layer fastener structure 4003 in the optical axis direction, wherein the first layer fastener structure 4004 is configured to be engaged with a third-layer structure 4005 in the driving portion carrier 4002, and the second layer fastener structure 4003 is configured to be engaged with a fourth-layer fastener structure 4006 in the driving portion carrier 4002.

It should be understood that the optical lens 4000 may be configured with more layers of fastener structures in the optical axis direction.

The second layer fastener structure 4003 can further reduce a movable range between the lens component 4001 and the driving portion carrier 4002, thereby reducing the possibility of causing the optical lens 4000 to tilt.

In the illustrated embodiment, the first layer fastener structure 4004 and the second layer fastener structure 4003 are aligned in the direction of the optical axis of the optical lens 4000, and an upper surface of the first layer fastener structure 4004 is configured with an inclined portion.

According to another embodiment (not shown) of the present application, the first layer fastener structure 4004 and the second layer fastener structure 4003 are not aligned in the direction of the optical axis of the optical lens 4000. In this case, it is advantageous to apply the glue material on the first layer fastener structure 4004 located below.

In the embodiment of the present application, the shape of the first layer fastener structure 4004 and the second layer fastener structure 4003 may be a common shape, or may be a combination of the fasteners described above. For example, the first layer fastener structure 4004 has a common shape, and the second layer fastener structure 4003 has an inclined surface in the rotation direction, or an inclined surface in the diameter direction, or a boss designed on the female fastener. It can also be that both the first layer fastener structure 4004 and the second layer structure 4003 have the above technical features.

Figure 5:
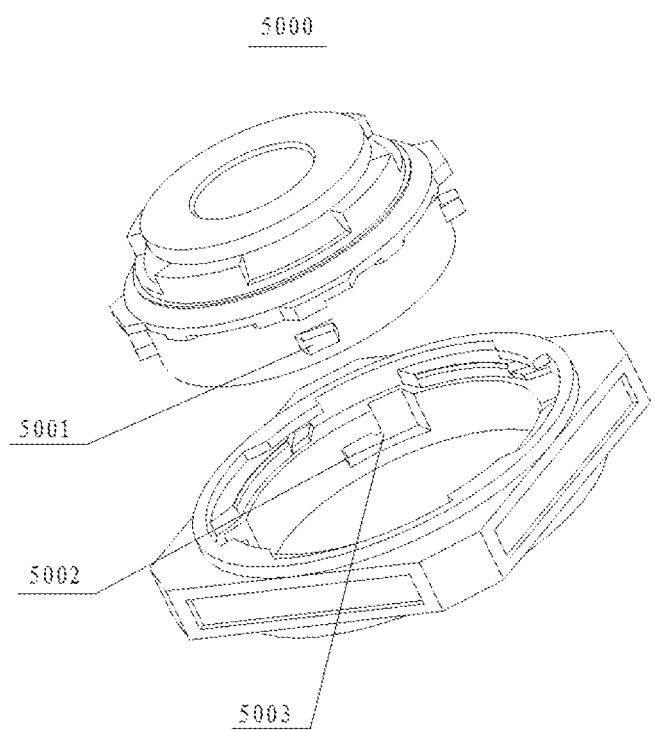
FIG. 5 shows a schematic exploded perspective view of an optical lens according to an embodiment of the present application, wherein a female fastener includes a boss to prevent a male fastener from releasing from the female fastener.

FIG. 5 shows a schematic exploded perspective view of an optical lens 5000 according to the fourth embodiment of the present application. The embodiment shown in FIG. 5 is substantially similar to the embodiment shown in FIG. 4.

The difference is that, as shown in FIG. 5, a female fastener 5002 includes a boss 5003, so as to prevent a male fastener 5001 from releasing from the female fastener 5002 after assembly.

As shown in FIG. 5, the optical lens 5000 includes: a lens component, including a lens and a lens barrel portion holding the lens therein, wherein an outer side portion of the lens barrel portion has a male fastener 5001 arranged in a circumferential direction; and a lens driving component, including a driving portion and a driving portion carrier, wherein the driving portion drives the lens component, and an inner side of the driving portion carrier has a female fastener 5002 arranged in a circumferential direction. The male fastener 5001 and the female fastener 5002 are engaged to couple the lens component and the driving portion carrier.

At the time of assembling the optical lens 5000 of the fourth embodiment, the male fastener on the lens component is aligned with a space between the female fasteners on the driving portion carrier of the lens driving component, and then the lens component is put into the driving portion carrier. Then, the lens component is rotated circumferentially around an optical axis of the optical lens to rotate the male fastener into the female fastener. Then, a glue material (not shown) is applied between the male fastener and the female fastener, and the glue material is cured by a curing method corresponding to the glue material, and finally the assembly of the lens component and the lens driving component is completed. The glue material can be a light curing, heat curing, moisture curing, anaerobic curing or oxidation curing glue.

As shown in FIG. 5, in addition to the male fastener 5001, that is, a first layer fastener structure, the optical lens 5000 is also configured with a second layer fastener structure in an optical axis direction.

In other words, the optical lens 5000 is a double-layer fastener structure, that is, the first layer fastener structure and the second layer fastener structure are configured in an axial direction, wherein the first layer fastener structure is configured to be engaged with a third-layer fastener structure in the driving portion carrier, and the second layer fastener structure is configured to be engaged with a fourth layer fastener structure 5006 in the driving portion carrier.

It should be understood that the optical lens 5000 may be configured with more layers of fastener structures in the optical axis direction.

In this embodiment, the female fastener 5002 is configured with a boss 5003 to limit the male fastener 5001 after assembly, so that the male fastener 5001 can be fixed in the female fastener after being rotated into the female fastener. Therefore, the risk of a position of the male fastener 5001 moving due to external factors (such as vibration and movement) is reduced.

It should be understood by those skilled in the art that the boss 5003 can also be arranged on the male fastener 5001 as required.

Figure 6:
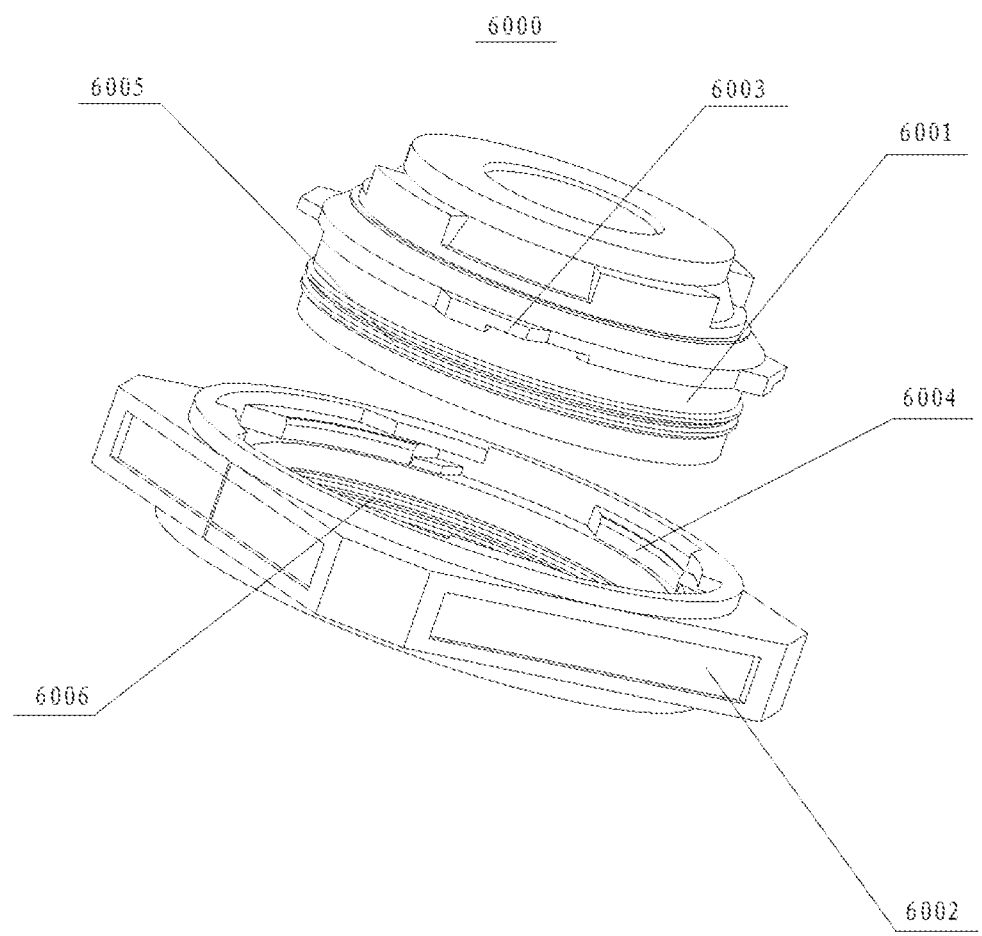
FIG. 6 shows a schematic perspective view of an optical lens according to an embodiment of the present application, wherein there is a first thread portion under a first fastener in an axial direction of a lens component, and there is a second thread portion under a second fastener in an axial direction of a driving portion carrier, and the first thread portion and the second thread portion are engaged with each other.

FIG. 6 shows a schematic perspective view of an optical lens 6000 according to the fifth embodiment of the present application.

As shown in FIG. 6, the optical lens 6000 includes: a lens component 6001, including a lens and a lens barrel portion holding the lens therein, wherein an outer side portion of the lens barrel portion has a male fastener 6003 arranged in a circumferential direction; and a lens driving portion, including a driving portion and a driving portion carrier 6002, wherein the driving portion drives the lens component 6001, and an inner side portion of the driving portion carrier 6002 has a female fastener 6004 arranged in a circumferential direction. The male fastener 6003 and the female fastener 6004 are engaged to couple the lens component 6001 and the driving portion carrier 6002.

At the time of assembling the optical lens 6000 of the fifth embodiment, the male fastener 6003 on the lens component 6001 is aligned with a space between the female fasteners 6004 on the driving portion carrier 6002 of the lens driving component, and then the lens component 6001 is placed into the driving portion carrier 6002. Then, the lens component 6001 is rotated circumferentially around an optical axis of the optical lens 6000 to rotate the male fastener 6003 into the female fastener 6004. Then, a glue material (not shown) is applied between the male fastener 6003 and the female fastener 6004, and the glue material is cured by a curing method corresponding to the glue material, and finally the assembly of the lens component 6000 and the lens driving component is completed. The glue material can be a light curing, heat curing, moisture curing, anaerobic curing or oxidation curing glue material.

Referring to FIG. 6, in addition to that the male fastener 6003 configured on the lens component 6001 of the optical lens 6000 and the female fastener 6004 configured on the driving portion carrier 6002 of the optical lens 6000 connect the lens component 6001 and the driving portion carrier 6002, the lens component 6000 of the optical lens 6000 has a first thread portion 6005 located below the male fastener 6003 in an axial direction, and the driving portion carrier 6002 of the optical lens 6000 has a second thread portion 6006 located below the female fastener 6004 in the axial direction, and the first thread portion 6005 and the second thread portion 6006 are configured to be engaged with each other when the lens component 6001 of the optical lens 6000 and the driving portion carrier 6002 are assembled.

In other words, by configuring thread portions on the lens barrel below the position of the male fastener 6003 and the corresponding driving portion carrier 6002, the combination of the thread portions is used to prevent the displacement of the lens component 6000 caused by the curing shrinkage of the glue material, thereby reducing the error caused by tilt and eccentricity.

In an embodiment, the number of thread-turns of the first thread portion 6005 and the second thread portion 6006 is set to 1 to 4 turns. In a further embodiment, the number of thread-turns of the first thread portion 6005 and the second thread portion 6006 is set to 1 to 2 turns. In this case, at the same time of reducing the debris generated by the thread portion, it can play a fixed role, thereby reducing the displacement of the lens component caused by the curing shrinkage of the glue material.

Figure 7:
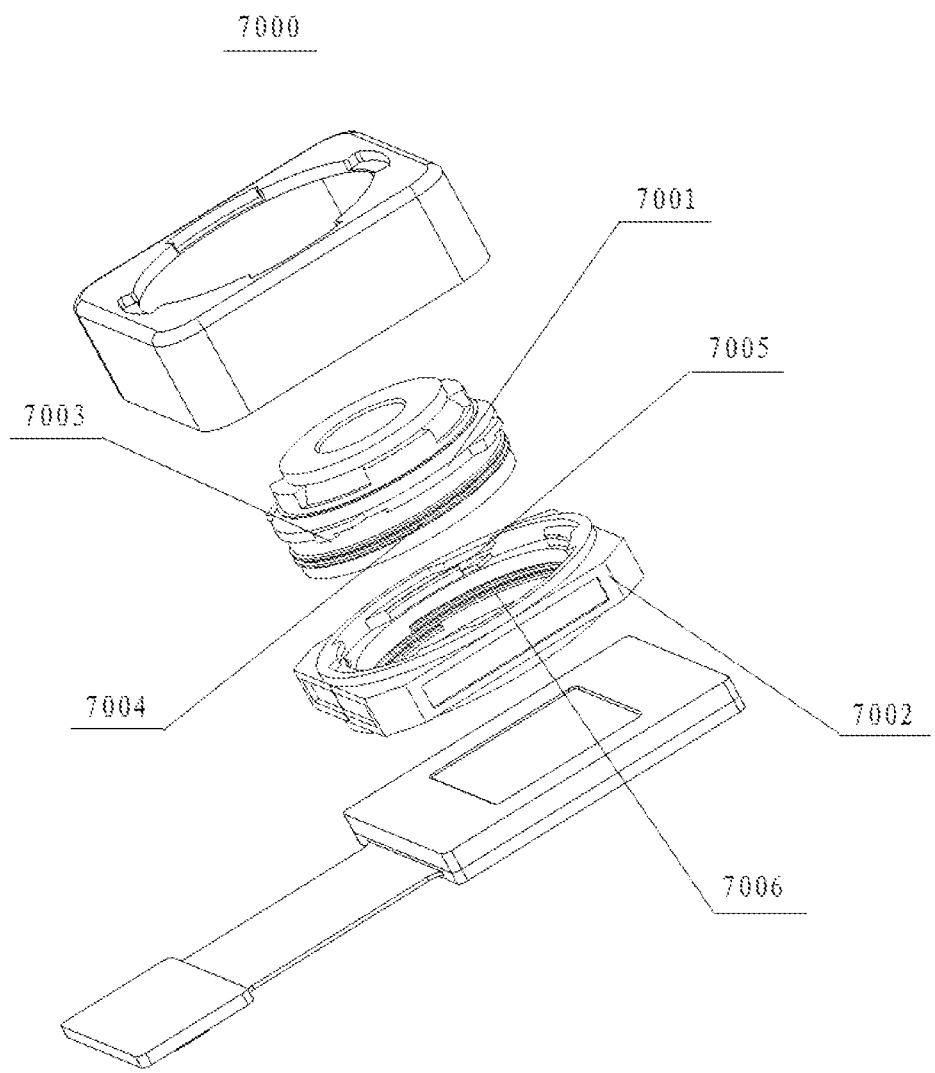
FIG. 7 shows a schematic exploded perspective view of an optical lens similar to FIG. 6 according to an embodiment of the present application.

FIG. 7 shows a schematic exploded perspective view of an optical lens 7000 similar to FIG. 6 according to the sixth embodiment of the present application.

As shown in FIG. 7, the optical lens 7000 includes: a lens component 7001, including a lens and a lens barrel portion holding the lens therein, wherein an outer portion of the lens barrel portion has a male fastener 7003 arranged in a circumferential direction; and a lens driving component, including a driving portion and a driving portion carrier 7002, wherein the driving portion drives the lens component, and an inner side portion of the driving portion carrier 7002 has a female fastener 7005 arranged in a circumferential direction. The male fastener 7003 and the female fastener 7005 are engaged to couple the lens component 7001 and the driving portion carrier 7002.

At the time of assembling the optical lens 7000 of the sixth embodiment, the male fastener 7003 on the lens component 7001 is aligned with a space between the female fasteners 7005 on the driving portion carrier 7002 of the lens driving component, and then the lens component 7001 is placed into the drive portion carrier 7002. Then, the lens component 7001 is rotated circumferentially around an optical axis of the optical lens 7000 to rotate the male fastener 7003 into the female fastener 7005. Then, a glue material (not shown) is applied between the male fastener 7003 and the female fastener 7005, and the glue material is cured by a curing method corresponding to the glue material, and finally the assembly of the lens component 7001 and the lens driving component is completed. The glue material can be a light curing, heat curing, moisture curing, anaerobic curing or oxidation curing glue material.

As shown in FIG. 7, in addition to that the male fastener 7003 configured on the lens component 7001 of the optical lens 7000 and the female fastener 7005 configured on the driving portion carrier 7002 of the optical lens 7000 connect the lens component 7001 and the driving portion, the lens component 7001 of the optical lens 7000 has a first thread portion 7004 located below the male fastener 7003 in an axial direction, and the driving portion carrier 7002 of the optical lens 7000 has a second thread portion 7006 located below the female fastener 7005 in the axial direction, and the first thread portion 7004 and the second thread portion 7006 are configured to be engaged with each other when the lens component 7001 of the optical lens 7000 and the driving portion carrier 7002 are assembled.

In other words, by configuring thread portions on the lens barrel below the position of the male fastener 7003 and on the corresponding driving portion carrier 7002, the combination of the thread portions is used to prevent the displacement of the lens component 7000 caused by the curing shrinkage of the glue material, thereby reducing the error caused by tilt and eccentricity. In an embodiment, the number of thread-turns of the first thread portion 7004 and the second thread portion 7006 is set to 1 to 4 turns. In a further embodiment, the number of thread-turns of the first thread portion 7004 and the second thread portion 7006 is set to 1 to 2 turns. In this case, at the same time of reducing the debris generated by the thread portion, it can play a fixed role, thereby reducing the displacement of the lens component caused by the curing shrinkage of the glue material.

Figure 8:
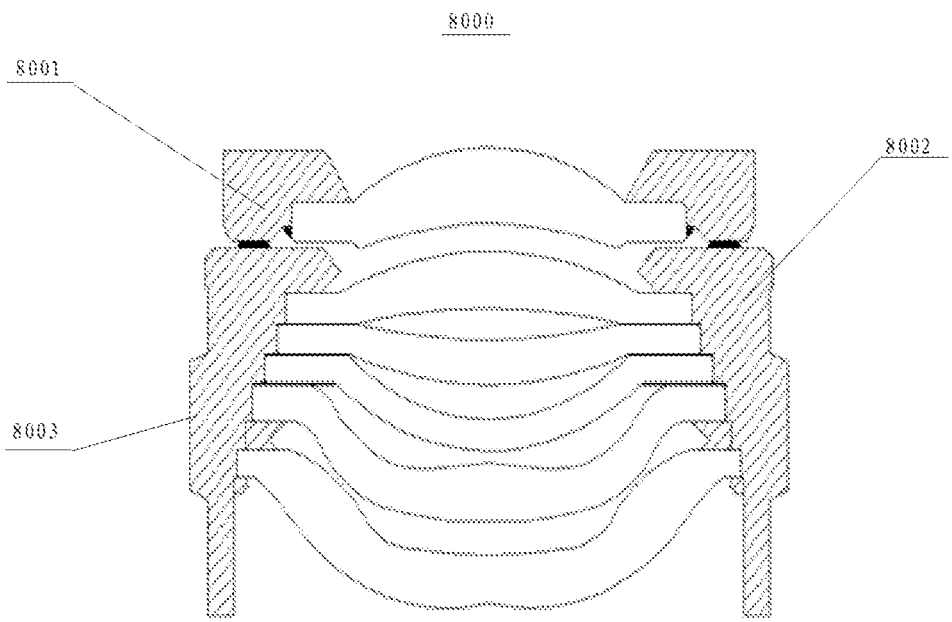
FIG. 8 shows a schematic partial cross-sectional view of a lens component according to an embodiment of the present application, wherein the lens component is a split lens component.

FIG. 8 shows a schematic partial cross-sectional view of a lens component 8000 according to the eighth embodiment of the present application.

The present application is not only applicable to conventional lens modules, but also applicable to the split lenses.

The lens component 8000 shown in FIG. 8 is a split lens. The lens has at least two lens components, that is, a first lens component 8001 and a second lens component 8002. FIG. 8 shows the first lens component 8001 and the second lens component 8002, wherein the first lens component 8001 includes at least one lens. The first lens component 8001 usually has a lens barrel, but may not have a lens barrel. The second lens component 8002 includes at least one lens and one lens barrel. After the first lens component 8001 and the second lens component 8002 are actively aligned, a glue material is applied, and then the first lens component 8001 and the second lens component 8002 are bonded by curing the glue material.

As shown in the figure, a male fastener 8003 is arranged on an outer circumferential side portion of the lens barrel of the second lens component 8002.

It can be seen from the above that the fastener structure described in the present application is also applicable to split lens components. Specifically, the fastener structure is located on the lens barrel of the second lens component 8002.

The difference between the lens component in this embodiment and a complete lens component is that the lens component is not a complete imaging system.

Figure 9:
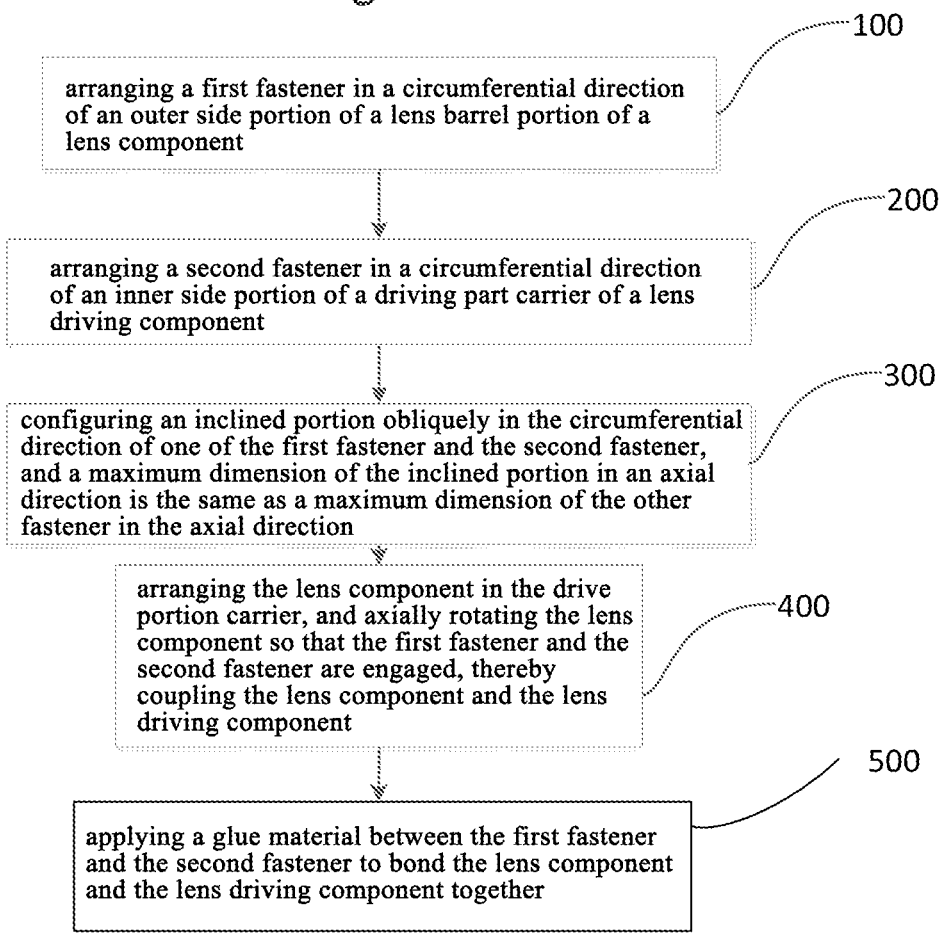
FIG. 9 shows a flowchart of a method for manufacturing an optical lens according to an embodiment of the present application.

FIG. 9 shows a flowchart of a method for manufacturing an optical lens according to an embodiment of the present application.

Referring to FIG. 9, the method for manufacturing the optical lens includes the following steps:

In step 100, a first fastener is arranged in a circumferential direction of an outer side portion of a barrel portion of a lens component;

In step 200, a second fastener is arranged in a circumferential direction of an inner side portion of a driving portion carrier of a lens driving component;

In step 300, an inclined portion is configured obliquely in the circumferential direction of one of a first fastener and a second fastener, and a maximum dimension of the inclined portion in an axial direction is the same as that of the other fastener in the axial direction;

In step 400, the lens component is arranged in the driving portion carrier, and the lens component is rotated circumferentially so that the first fastener and the second fastener are engaged, thereby coupling the lens component and the lens driving component; and In step 500, a glue material is applied between the first fastener and the second fastener to bond the lens component and the lens driving component together.

In an embodiment of the present application, the step of obliquely configuring the inclined portion in the circumferential direction of one of the first fastener and the second fastener includes: configuring the inclined portion on an upper surface and/or a lower surface of the male fastener in the axial direction.

The above description is only a preferred embodiment of the present application and an explanation of the applied technical principles. Those skilled in the art should understand that the scope of protection involved in the present application is not limited to the technical solutions formed by the specific combination of the above technical features, and should also cover other technical solutions formed by any combination of the above technical features or equivalent features without departing from the technical concept. For example, the above-mentioned features and the technical features disclosed in the present application (but not limited to) with similar functions are replaced with each other to form a technical solution.

The invention claimed is:

1. An optical lens, comprising:
a lens component including at least one first lens and a lens barrel portion holding the at least one first lens therein, an outer side portion of the lens barrel portion having a first fastener and a first coupling portion arranged in a circumferential direction; and
a lens driving component including a driving portion and a driving portion carrier, the driving portion being configured to drive the lens component, and an inner side portion of the driving portion carrier having a second fastener and a second coupling portion arranged in the circumferential direction,
wherein the first fastener and the second fastener are engaged, and the first coupling portion and the second coupling portion are engaged to jointly couple the lens component and the lens driving component, and
wherein one of the first fastener and the second fastener has an inclined portion inclined relative to the circumferential direction at an upper surface or a lower surface in an optical axis direction so that a lower end of the one of the first fastener and the second fastener enters another of the first fastener and the second fastener through rotation during an assembly process.

2. The optical lens according to claim 1, wherein the first coupling portion and the second coupling portion include threads or fasteners.

3. The optical lens according to claim 1, wherein the inclined portion is an inclined surface.

4. The optical lens according to claim 1, wherein a maximum dimension of the inclined portion in the optical axis direction is the same as a maximum dimension of the another of the first fastener and the second fastener in the optical axis direction.

5. The optical lens according to claim 1, further comprising a glue material, the glue material being located between the first fastener and the second fastener to bond the lens component and the lens driving component together.

6. The optical lens according to claim 1, wherein the first fastener is a male fastener, and the second fastener is a female fastener.

7. The optical lens according to claim 6, wherein at least one of the first fastener and the second fastener includes a boss to prevent the male fastener from releasing from the female fastener.

8. The optical lens according to claim 1, wherein the first fastener and the second fastener, and the first coupling portion and the second coupling portion are evenly distributed along the circumferential direction.

9. The optical lens according to claim 5, wherein the glue material is a light curing, thermal curing, moisture curing, anaerobic curing or oxidative curing glue material.

10. The optical lens according to claim 1, wherein the lens component is a split lens component.

11. An optical lens, comprising:
- a lens component including at least one first lens and a lens barrel portion holding the at least one first lens therein, an outer side portion of the lens barrel portion having a first fastener arranged in a circumferential direction; and
- a lens driving component including a driving portion and a driving portion carrier, the driving portion being configured to drive the lens component, and an inner side portion of the driving portion carrier having a second fastener arranged in the circumferential direction,
- wherein the first fastener and the second fastener are engaged to couple the lens component and the lens driving component, and the first fastener and/or the second fastener has an inclined portion,
- wherein the inclined portion is inclined relative to the circumferential direction at an upper surface or a lower surface in an optical axis direction so that a lower end of one of the first fastener and the second fastener enters another of the first fastener and the second fastener through rotation during an assembly process.

12. The optical lens according to claim 11, wherein the inclined portion is located on the upper surface or the lower surface of the one of the first fastener and the second fastener in the optical axis direction, and is inclined relative to the circumferential direction.

13. The optical lens according to claim 11, wherein the inclined portion is located on the lower surface of the first fastener and the second fastener in the optical axis direction, and is inclined relative to a radial direction.

14. The optical lens according to claim 12, wherein a maximum dimension of the inclined portion in the optical axis direction is the same as a maximum dimension of another of the first fastener and the second fastener in the optical axis direction.

15. The optical lens according to claim 11, wherein the first fastener and the second fastener are configured in two or more layers along the optical axis direction.

16. A method of manufacturing an optical lens, the method comprising:
- arranging a first fastener along a circumferential direction of an outer side portion of a lens barrel portion of a lens component, the lens component including at least one first lens and the lens barrel portion holding the at least one first lens therein;
- arranging a second fastener along a circumferential direction of an inner side portion of a driving portion carrier of a lens driving component, the lens driving component including a driving portion and the driving portion carrier, the driving portion being configured to drive the lens component;
- configuring an inclined portion on the first fastener and/or the second fastener such that the inclined portion is inclined relative to the circumferential direction of the first fastener and/or the second fastener at an upper surface or a lower surface in an optical axis direction;
- assembling the lens component and the lens driving component so that a lower end of one of the first fastener and the second fastener enters another of the first fastener and the second fastener through rotation; and
- applying a glue material between the first fastener and/or the second fastener to bond the lens component and the lens driving component together.

17. The method of manufacturing an optical lens according to claim 16, wherein the configuring comprises configuring the inclined portion on the one of the first fastener and the second fastener.

18. The method of manufacturing an optical lens according to claim 16, wherein the configuring comprises configuring the inclined portion on the lower surface of the first fastener and the second fastener in the optical axis direction and to be inclined relative to a radial direction.

19. The method of manufacturing an optical lens according to claim 16, wherein the first fastener and the second fastener are configured in two or more layers along the optical axis direction.

* * * * *